(12) United States Patent
Chen et al.

(10) Patent No.: US 11,395,115 B2
(45) Date of Patent: Jul. 19, 2022

(54) RESOURCE ALLOCATION IN PRESENCE OF IN-BAND EMISSION FOR NR V2X MOBILE COMMUNICATIONS

(71) Applicant: MediaTek Inc., Hsinchu (TW)

(72) Inventors: Ju-Ya Chen, Hsinchu (TW); Ahmet Umut Ugurlu, Cambridge (GB)

(73) Assignee: MediaTek Inc.

( * ) Notice: Subject to any disclaimer, the term of this patent is extended or adjusted under 35 U.S.C. 154(b) by 0 days.

(21) Appl. No.: 16/739,116

(22) Filed: Jan. 10, 2020

(65) Prior Publication Data

US 2020/0228947 A1 Jul. 16, 2020

Related U.S. Application Data

(60) Provisional application No. 62/791,117, filed on Jan. 11, 2019.

(51) Int. Cl.
*H04W 4/00* (2018.01)
*H04W 4/40* (2018.01)
*H04W 72/04* (2009.01)
*H04W 28/26* (2009.01)
*H04B 17/318* (2015.01)
(Continued)

(52) U.S. Cl.
CPC ............ *H04W 4/40* (2018.02); *H04B 17/318* (2015.01); *H04W 28/26* (2013.01); *H04W 72/02* (2013.01);
(Continued)

(58) Field of Classification Search
CPC ..... H04W 72/02; H04W 92/18; H04W 76/14; H04W 4/40; H04W 72/042;
(Continued)

(56) References Cited

U.S. PATENT DOCUMENTS

2014/0274078 A1* 9/2014 Hyde .................. H04W 16/18
455/446
2016/0044724 A1* 2/2016 Seo ....................... H04L 1/1812
370/329
(Continued)

FOREIGN PATENT DOCUMENTS

WO WO 2017169111 A1 5/2017
WO WO 2017169111 A1 10/2017
WO WO 2017176098 A1 10/2017

OTHER PUBLICATIONS

China National Intellectual Property Administration, International Search Report and Written Opinion for PCT/CN2020/071437, dated Mar. 26, 2020.
(Continued)

*Primary Examiner* — Khalid W Shaheed
(74) *Attorney, Agent, or Firm* — Han IP PLLC; Andy M. Han

(57) ABSTRACT

Various examples and schemes pertaining to resource allocation in presence of in-band emission (IBE) for New Radio (NR) vehicle-to-everything (V2X) mobile communications are described. An apparatus implemented in a user equipment (UE) identifies a first resource of a plurality of resources used by another UE in a vehicle-to-everything (V2X) communication environment. The apparatus selects a second resource of the plurality of resources adjacent to the first resource. Then, the apparatus performs transmission in the second resource.

20 Claims, 5 Drawing Sheets

(51) Int. Cl.
*H04W 72/02* (2009.01)
*H04W 92/18* (2009.01)

(52) U.S. Cl.
CPC ........ *H04W 72/0453* (2013.01); *H04W 92/18* (2013.01)

(58) Field of Classification Search
CPC ......... H04W 72/0446; H04W 72/0453; H04W 72/04; H04W 72/0493
See application file for complete search history.

(56) References Cited

U.S. PATENT DOCUMENTS

2017/0230816 A1* 8/2017 Chatterjee ........... H04W 72/042
2018/0132254 A1* 5/2018 Chae .................... H04W 76/14
2019/0075548 A1* 3/2019 Lee ..................... H04W 72/044
2019/0394786 A1* 12/2019 Parron ................ H04L 27/0006
2020/0053528 A1* 2/2020 Wang .................... H04L 5/0044
2020/0260413 A1* 8/2020 Hong .................... H04W 72/02

OTHER PUBLICATIONS

NTT DoCoMo, Inc., Further details of UE autonomous resource (re)selection for V2V, R1-167355, Aug. 12, 2016.
Taiwan Intellectual Property Office, Office Action for Taiwan Patent Application No. 109100910, dated Feb. 2, 2021.
3rd Generation Partnership Project, 3GPP TS 36.213 V15.3.0; Technical Specification Group Radio Access Network; Evolved Universal Terrestrial Radio Access (E-UTRA); Physical layer procedure (Rlease 15), Oct. 1, 2018, Chap. 14.1.1.5, 14.1.1.6, 14.1.5, 14.2.1, 14.2.3.

* cited by examiner

RESOURCE ALLOCATION IN PRESENCE OF IN-BAND EMISSION FOR NR V2X MOBILE COMMUNICATIONS

CROSS REFERENCE TO RELATED PATENT APPLICATION(S)

The present disclosure is part of a non-provisional application claiming the priority benefit of U.S. Patent Application No. 62/791,117, filed on 11 Jan. 2019, the content of which being incorporated by reference in its entirety.

TECHNICAL FIELD

The present disclosure is generally related to wireless communications and, more particularly, to techniques pertaining to resource allocation in presence of in-band emission (IBE) for New Radio (NR) vehicle-to-everything (V2X) mobile communications.

BACKGROUND

Unless otherwise indicated herein, approaches described in this section are not prior art to the claims listed below and are not admitted as prior art by inclusion in this section.

In general, the transmission power in a broadcasting system is nearly constant from one user equipment (UE) to another. Consequently, the received power of a signal from a near UE tends to be greater than the received power of a signal from a distant UE. In enhanced mobile broadband (eMBB), a base station (BS) can use power control to adjust the transmission power of a given UE so that signals received by the BS from different UEs can be received at similar received power levels. However, power control is not suitable in the context of V2X mobile communications. For instance, with IBE, a signal from a distant UE may be interfered by a signal from a near UE when adjacent time-frequency resources are used by the distant UE and the near UE. Consequently, IBE can negatively impact system performance in V2X mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure aims to propose concepts, solutions, schemes, techniques, designs, methods and apparatus pertaining to resource allocation in presence of IBE for NR V2X mobile communications. In particular, various proposed schemes in accordance with the present disclosure may allocate adjacent time-frequency resources for nearby UEs in a V2X network.

In one aspect, a method may involve a processor of an apparatus implemented in a UE, identifying a first resource of a plurality of resources used by another UE in a V2X communication environment. The method may also involve the processor selecting a second resource of the plurality of resources adjacent to the first resource. The method may further involve the processor performing transmission in the second resource.

In another aspect, an apparatus implemented as a UE may include a communication device and a processor coupled to the communication device. The communication device may be configured to communicate wirelessly in a V2X communication environment. The processor may be configured to identify a first resource of a plurality of resources used by another UE. The processor may also be configured to select a second resource of the plurality of resources adjacent to the first resource. The processor may further be configured to performing, via the communication device, transmission in the second resource.

It is noteworthy that, although description provided herein may be in the context of certain radio access technologies, networks and network topologies such as NR V2X, the proposed concepts, schemes and any variation(s)/derivative(s) thereof may be implemented in, for and by other types of radio access technologies, networks and network topologies such as, for example and without limitation, $5^{th}$ Generation (5G), Long-Term Evolution (LTE), LTE-Advanced, LTE-Advanced Pro and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to resource allocation in presence of IBE for NR V2X mobile communications. According to the present disclosure, a number of possible solutions may be implemented separately or jointly. That is, although these possible solutions may be described below separately, two or more of these possible solutions may be implemented in one combination or another.

Figure 1:
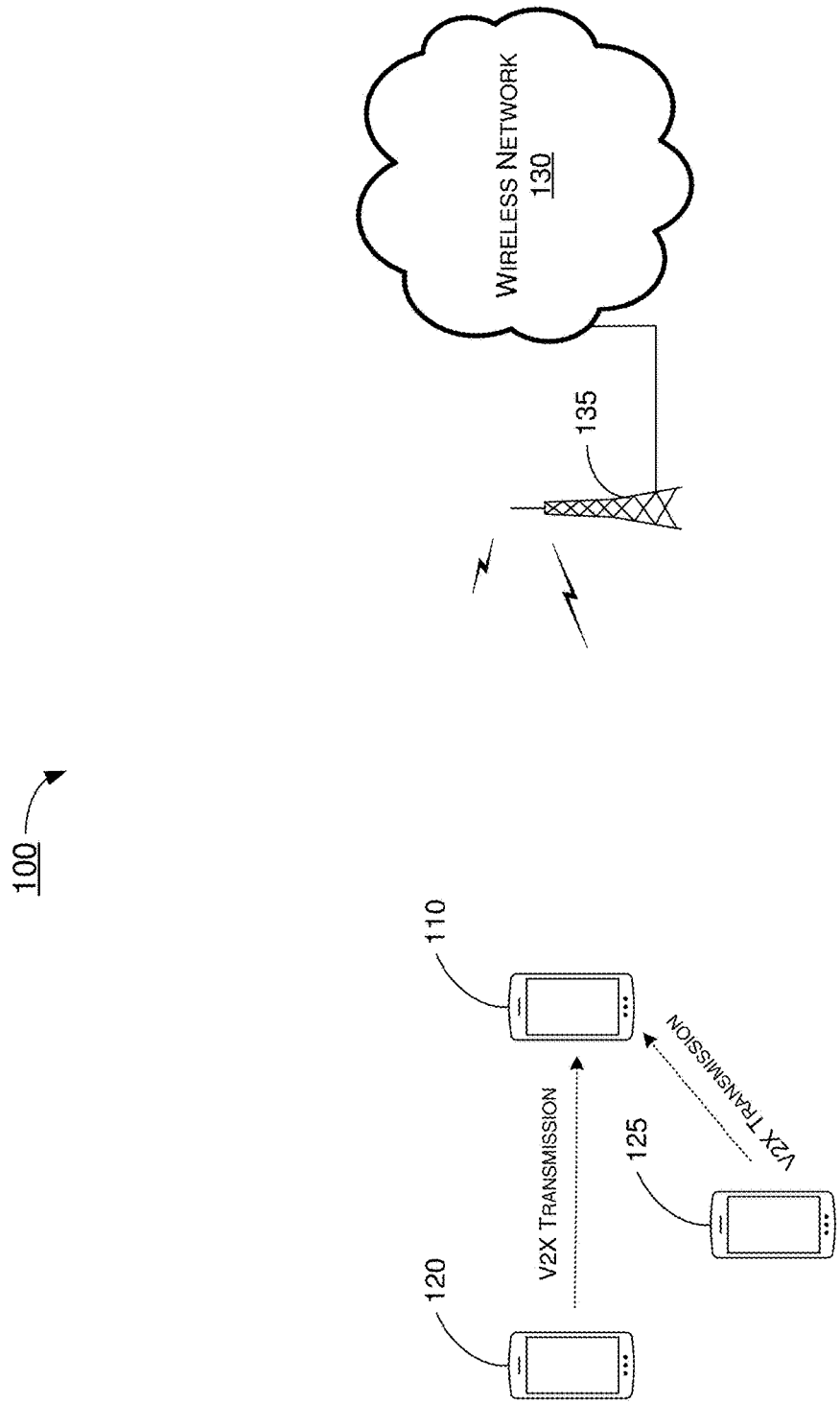
FIG. 1 is a diagram of an example network environment in which various solutions and schemes in accordance with the present disclosure may be implemented.
Figure 2:
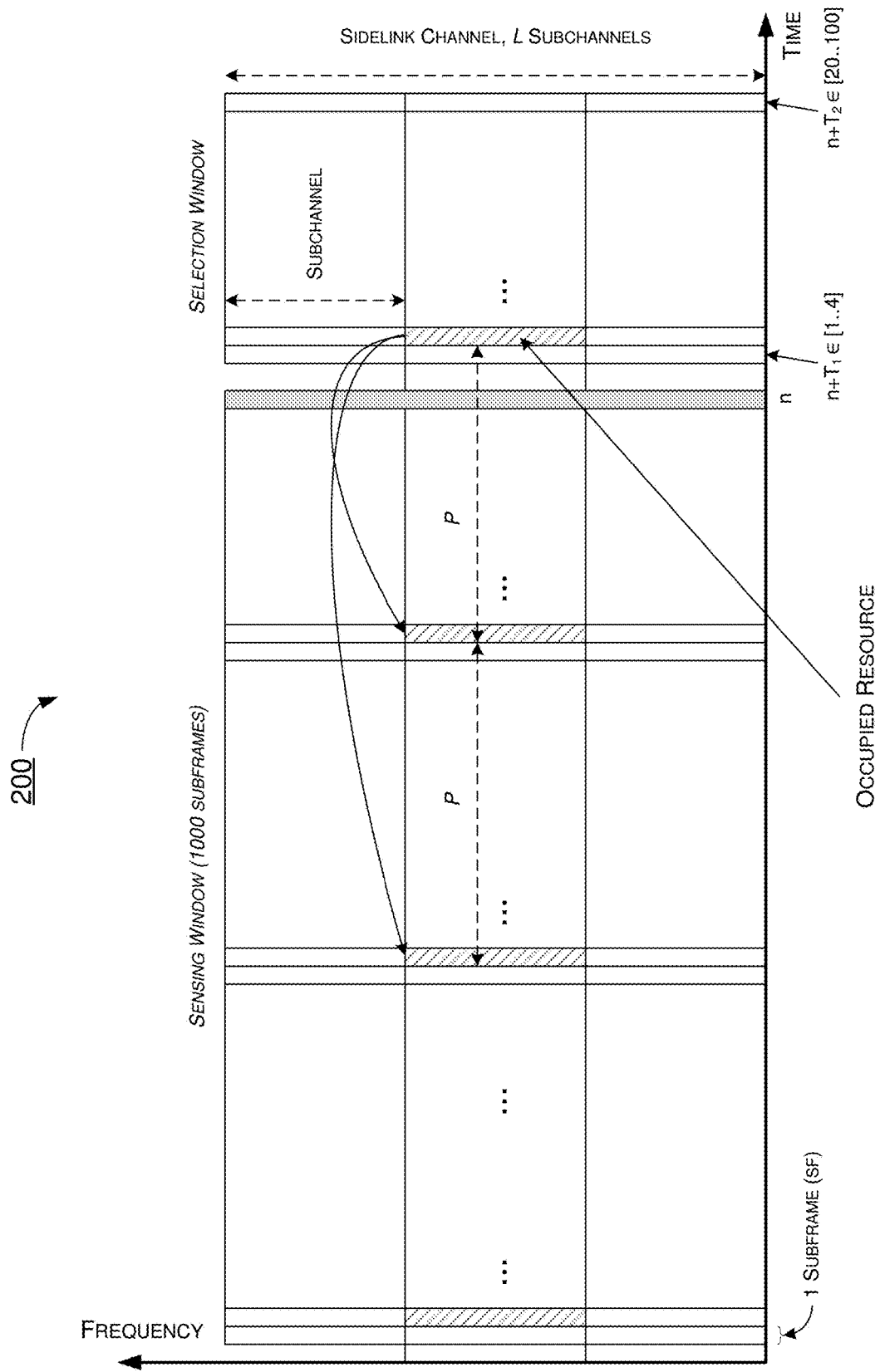
FIG. 2 is a diagram of an example scenario in accordance with an implementation of the present disclosure may be implemented.
Figure 3:
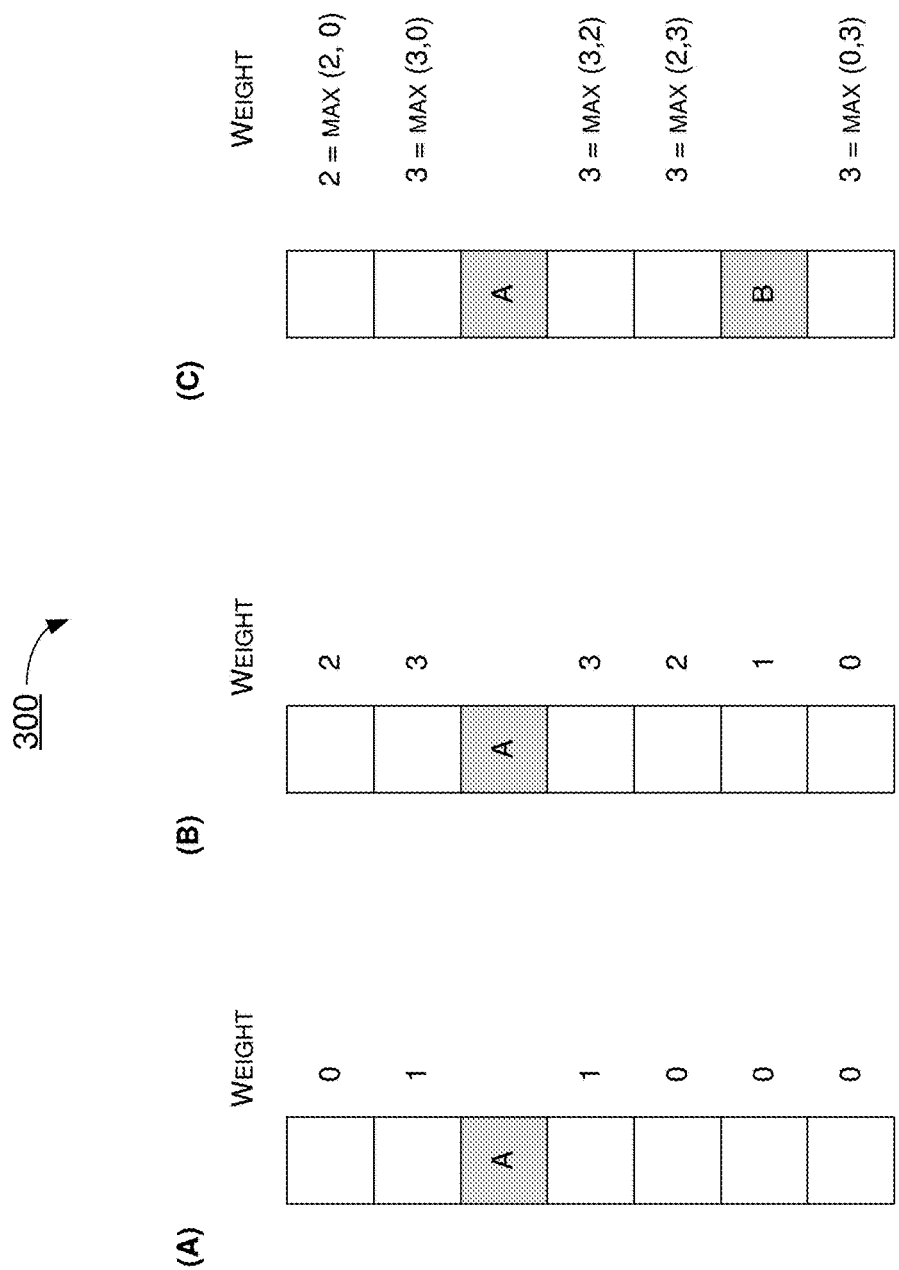
FIG. 3 is a diagram of an example scenario in accordance with an implementation of the present disclosure may be implemented.

FIG. 1 illustrates an example network environment 100 in which various solutions and schemes in accordance with the present disclosure may be implemented. FIG. 2 illustrates an example scenario 200 in accordance with an implementation of the present disclosure may be implemented. FIG. 3 illustrates an example scenario 300 in accordance with an implementation of the present disclosure may be implemented. Each of scenario 200 and scenario 300 may be implemented in network environment 100.

Referring to FIG. 1, network environment 100 may be an NR V2X communication environment involving a first UE 110, a second UE 120, a third UE 125. Optionally, network environment 100 may also involve and a wireless network 130. Wireless network 130 may be in wireless communication with one or more of first UE 110, second UE 120 and third UE 125 via a base station 135 (e.g., an eNB, gNB or transmit/receive point (TRP)). First UE 110 may be in wireless communication with second UE 120 and third UE 125 via a first NR sidelink and a second NR sidelink, respectively. Each of first UE 110, second UE 120 and third UE 125 may be in or as a part of, for example and without limitation, a portable apparatus (e.g., smartphone), a vehicle or a component thereof, a roadside unit (RSU) (e.g., a traffic signal, a street lamp, a roadside sensor or a roadside structure) or an Internet of Thing (IoT) device (e.g., a sensor). In network environment 100, first UE 110, second UE 120, third UE 125 and wireless network 130 (via base station 135) may implement various schemes pertaining to resource allocation in presence of IBE for NR V2X mobile communications in accordance with the present disclosure, as described below. It is noteworthy that, although FIG. 1 shows first UE 110 simultaneously in communication with second UE 120 and third UE 125 via NR sidelinks, in various scenarios first UE 110 may be simultaneously in communication with a different number (e.g., more than two) UEs via NR sidelinks while implementing one or more proposed schemes in accordance with the present disclosure.

Referring to FIG. 2, in NR V2X in network environment 100, first UE 110 may identify one or more occupied time-frequency resources by performing a sensing procedure, as shown in FIG. 2, and then select all or part of the available time-frequency resources that can fit within a size of a transmission of sidelink control information (SCI) and data payload(s). First UE 110 may then pass this information to its medium access control (MAC) layer to perform resource selection/allocation. In scenario 200, there may be a quantity of L of subchannels in a sidelink channel. As shown in FIG. 2, a given time-frequency resource within a certain subchannel and during a certain subframe may be identified by first UE 110 as occupied (e.g., used for transmission by second UE 120 and/or third UE 125). First UE 110 may then perform resource selection based on a result of the sensing as described below with reference to FIG. 2.

Under a proposed scheme in accordance with the present disclosure, first UE 110 may set a selection window as $[n+T_1, n+T_2]$ and continuously monitor decoded SCI within the selection window. From the decoded SCI, first UE 110 may identify occupied time-frequency resource(s) and reserved time-frequency resource(s). First UE 110 may also set a signal power threshold to be $P_{Th}$ and initialize sets $S_A$ and $S_B$ as complete and empty sets, respectively. First UE 110 may exclude all single-slot candidate resources in case first UE 110 has not monitored corresponding resources in the selection window. Out of all remaining single-slot candidate resources, first UE 110 may exclude those that are reserved or those in which a Physical Sidelink Shared Channel (PSSCH) and/or Physical Sidelink Control Channel (PSCCH) reference signal received power (RSRP) measurement is higher than $P_{Th}$. In an event that the remaining single-slot candidate resources are less than a predetermined percentage (e.g., 20%) of total resources, first UE 110 may increase the power threshold $P_{Th}$ by a predetermined amount (e.g., 3 dB) and repeat the exclusion process. Under the proposed scheme, first UE 110 may move the resultant predetermined percentage (e.g., 20%) of single-slot candidate resources in set $S_A$ to set $S_B$ which is reported to higher layer(s). Moreover, under the proposed scheme, the MAC layer of first UE 110 may select a candidate resource from set $S_B$ to be used for transmission.

Under the proposed scheme, in reporting to higher layer(s) the resultant predetermined percentage (e.g., 20%) of single-slot candidate resources that are moved from set $S_A$ to set $S_B$, first UE 110 may report those single-slot candidate resources each with a respective weighting function or weighting value $w_i^f$. This may be achieved under one of several options. Under a first option (or option 1), the MAC layer may select a candidate resource of set $S_B$ with a non-zero weighting value for transmission. Under a second option (or option 2), the MAC layer may select a candidate resource of set $S_B$ based on the respective weighting value of each resource in set $S_B$ being proportional to a probability for transmission (e.g., the higher probability for transmission the higher the likelihood of selection).

With respect to resource selection in the presence of IBE, first UE 110 may perform certain operations in accordance with the present disclosure. Description below is provided with reference to FIG. 3. For instance, first UE 110 may set a power threshold $P_{Th}$, which may be dynamically configured by wireless network 130 (via base station 135), pre-configured by wireless network 130 (via base station 135) or determined by first UE 110 based on its transmission power. First UE 110 may initialize or otherwise set the weighting value of all subchannels in set $S_B$ to a predetermined value (e.g., 0 or 1). In an event that PSSCH or PSCCH of a subchannel i is greater than $P_{Th}$, first UE 110 may take either of two actions.

For instance, first UE 110 may set the weighting values $w_{i, i-1}$ and $w_{i, i+1}$ of neighboring subchannels i−1 and i+1 (which are adjacent to and on two opposite sides of subchannel i) as a predetermined value (e.g., 1 or X), respectively. Referring to the example shown in part (A) of FIG. 3, first UE 110 may, upon sensing a power level in subchannel A being greater than $P_{Th}$, determine subchannel A as an occupied resource. Accordingly, first UE 110 may increment the weighting values of the two neighboring subchannels (subchannels A−1 and A+1) that are adjacent to and on two opposite sides of subchannel A from 0 to 1, assuming the respective weighting value of each subchannel was initially set to an initial value of 0.

Alternatively, first UE 110 may set the weighting values of neighboring subchannels such that, on each of the two opposite sides of subchannel i, the respective weighting value of an adjacent resource is increased by a first amount and a next adjacent resource is increased by a second amount smaller than the first amount. For instance, first UE 110 may set the weighting values of neighboring subchannels in a cascading fashion (e.g., $w_{i,\ i-1}=a$, $w_{i,\ i-2}=a-1$, $w_{i,\ i-3}=a-2$, and so on). Referring to the example shown in part (B) of FIG. 3, first UE 110 may, upon sensing a power level in subchannel A being greater than $P_{Th}$, determine subchannel A as an occupied resource. Accordingly, first UE 110 may set the weighting values of neighboring subchannels of subchannel A in a cascading fashion. Specifically, for each of the two neighboring subchannels (subchannels A−1 and A+1) that are adjacent to and on two opposite sides of subchannel A, first UE 110 may set the respective weighting value to 3, assuming the respective weighting value of each subchannel was initially set to 0. Additionally, for the next adjacent subchannels on the two opposite sides (subchannels A−2 and A+2), first UE 110 may set the respective weighting value to 2, assuming the respective weighting value of each subchannel was initially set to 0. Moreover, for the still next adjacent subchannels on the two opposite sides (subchannels A−3 and A+3), first UE 110 may set the respective weighting value to 1, assuming the respective weighting value of each subchannel was initially set to 0.

Referring to the example shown in part (C) of FIG. 3, first UE 110 may, upon sensing a respective power level in each of subchannel A and subchannel B being greater than $P_{Th}$, determine each of subchannel A and subchannel B as an occupied resource. In this example, first UE 110 may set the weighting values of neighboring subchannels of each of subchannel A and subchannel B in a cascading fashion as described above respective to each of subchannel A and subchannel B. Then, first UE 110 may calculate a combined weighting value of each subchannel. For instance, first UE 110 may calculate a combined weighting value of each subchannel by using a maximum function (e.g., $w^f_i = \max_j(w_{j,\ i})$). Alternatively, first UE 110 may calculate a combined weighting value of each subchannel by using linear combination.

Under the proposed scheme, with respect to resource selection in the presence of IBE, first UE 110 may perform resource selection by one of multiple approaches upon having identified one or more occupied subchannels in set $S_B$ and having determined the combined weighting value of neighboring subchannels of the occupied subchannel(s). Under a first approach, first UE 110 may form a set of subchannels with weighting values greater than the initial value (e.g., 0), and first UE 110 may, at the MAC layer, select a candidate subchannel from the set. Under a second approach, first UE 110 may sort the subchannels in set $S_B$ by their weighting values (e.g., in a descending order from high to low). First UE 110 may then pick a top predetermined percentage (e.g., top Y %) of the sorted subchannels for random selection. Alternatively, first UE 110 may select the subchannel with the largest weighting value or select the subchannel from a group of subchannels with the largest weighting value (when there are more than one subchannel with the same largest weighting value). Under a third approach, first UE 110 may, at the MAC layer, select the subchannel based on the respective weighting value of each subchannel being proportional to a probability value. As an example, given ten subchannels with subchannels 2 and 4 having a weighting value of X=5, which is higher than that of other subchannels, first UE 110 may select subchannels 2 and 4, as each of subchannels 2 and 4 has a probability of 5/18 while each of the remaining eight subchannels has a probability of 1/18.

Illustrative Implementations

Figure 4:
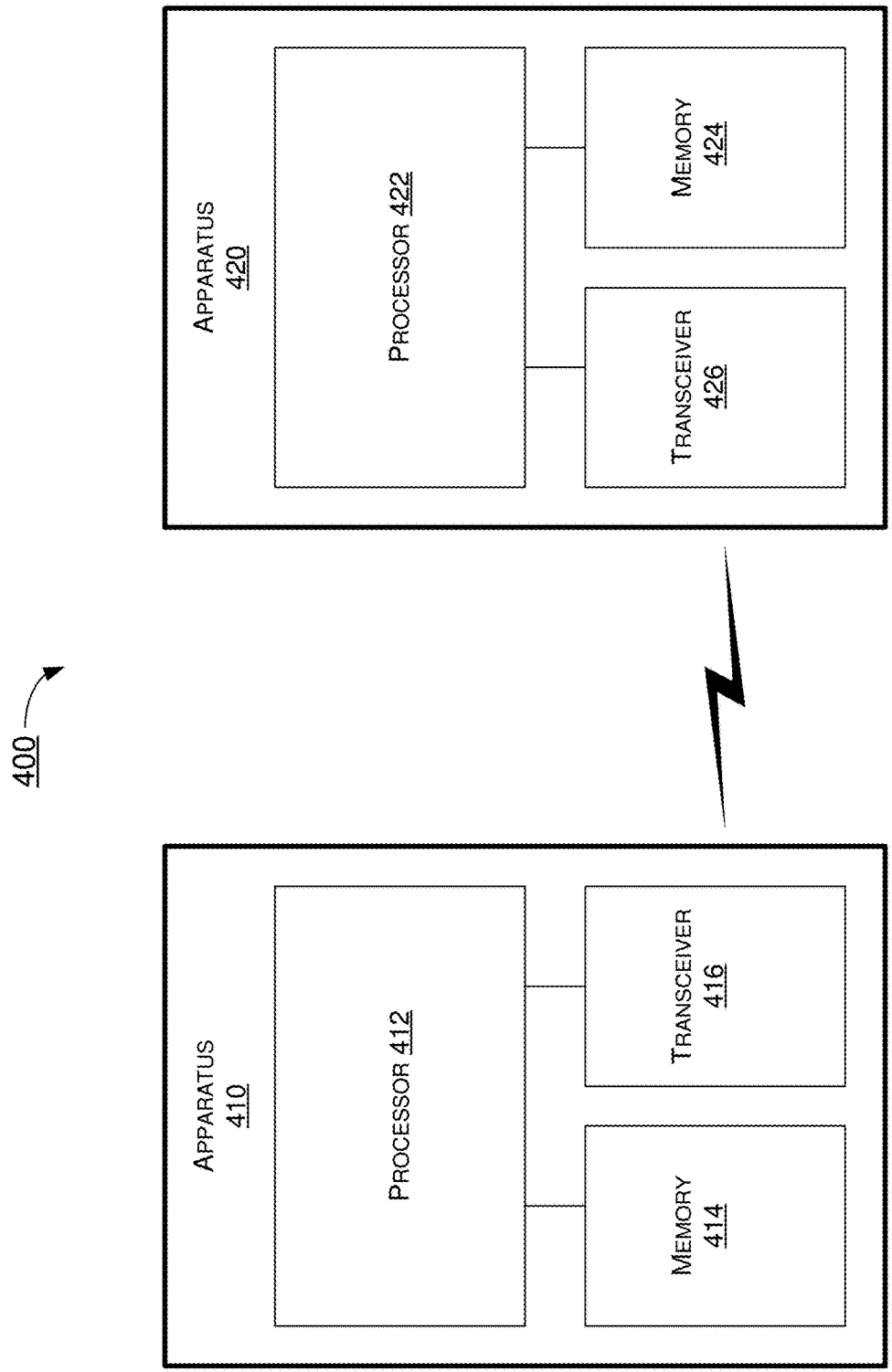
FIG. 4 is a block diagram of an example communication system in accordance with an implementation of the present disclosure.

FIG. 4 illustrates an example communication system 400 having an example apparatus 410 and an example apparatus 420 in accordance with an implementation of the present disclosure. Each of apparatus 410 and apparatus 420 may perform various functions to implement schemes, techniques, processes and methods described herein pertaining to resource allocation in presence of IBE for NR V2X mobile communications, including various schemes described above as well as processes described below.

Each of apparatus 410 and apparatus 420 may be a part of an electronic apparatus, which may be a UE such as a vehicle, a portable or mobile apparatus, a wearable apparatus, a wireless communication apparatus or a computing apparatus. For instance, each of apparatus 410 and apparatus 420 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 410 and apparatus 420 may also be a part of a machine type apparatus, which may be an IoT or NB-IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. Alternatively, each of apparatus 410 and apparatus 420 may be implemented in the form of one or more integrated-circuit (IC) chips such as, for example and without limitation, one or more single-core processors, one or more multi-core processors, one or more multi-core processors, one or more reduced-instruction set computing (RISC) processors, or one or more complex-instruction-set-computing (CISC) processors. Each of apparatus 410 and apparatus 420 may include at least some of those components shown in FIG. 4 such as a processor 412 and a processor 422, respectively. Each of apparatus 410 and apparatus 420 may further include one or more other components not pertinent to the proposed scheme of the present disclosure (e.g., internal power supply, display device and/or user interface device), and, thus, such component(s) of each of apparatus 410 and apparatus 420 are neither shown in FIG. 4 nor described below in the interest of simplicity and brevity.

In some implementations, at least one of apparatus 410 and apparatus 420 may be a part of an electronic apparatus, which may be a vehicle, a roadside unit (RSU), network node or base station (e.g., eNB, gNB or TRP), a small cell, a router or a gateway. For instance, at least one of apparatus 410 and apparatus 420 may be implemented in a vehicle in a vehicle-to-vehicle (V2V) or V2X network, an eNodeB in an LTE, LTE-Advanced or LTE-Advanced Pro network or in a gNB in a 5G, NR, IoT or NB-IoT network. Alternatively, at least one of apparatus 410 and apparatus 420 may be implemented in the form of one or more IC chips such as, for example and without limitation, one or more single-core processors, one or more multi-core processors, or one or more RISC or CISC processors.

In one aspect, each of processor 412 and processor 422 may be implemented in the form of one or more single-core processors, one or more multi-core processors, or one or more RISC or CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including resource allocation in presence of IBE for NR V2X mobile communications in accordance with various implementations of the present disclosure.

In some implementations, apparatus 410 may also include a transceiver 416, as a communication device, coupled to processor 412 and capable of wirelessly transmitting and receiving data. In some implementations, apparatus 410 may further include a memory 414 coupled to processor 412 and capable of being accessed by processor 412 and storing data therein. In some implementations, apparatus 420 may also include a transceiver 426, as a communication device, coupled to processor 422 and capable of wirelessly transmitting and receiving data. In some implementations, apparatus 420 may further include a memory 424 coupled to processor 422 and capable of being accessed by processor 422 and storing data therein. Accordingly, apparatus 410 and apparatus 420 may wirelessly communicate with each other via transceiver 416 and transceiver 426, respectively.

To aid better understanding, the following description of the operations, functionalities and capabilities of each of apparatus 410 and apparatus 420 is provided in the context of an NR V2X communication environment in which apparatus 410 is implemented in or as a wireless communication device, a communication apparatus or a UE (e.g., first UE 110) and apparatus 420 is implemented in or as another UE (e.g., second UE 120 or third UE 125) in network environment 100.

In one aspect of resource allocation in presence of IBE for NR V2X mobile communications in accordance with the present disclosure, processor 412 of apparatus 410 identify, via transceiver 416, a first resource of a plurality of resources used by another UE in a V2X communication environment. Additionally, processor 412 may select a second resource of the plurality of resources adjacent to the first resource. Moreover, processor 412 may perform, via transceiver 416, transmission in the second resource.

In some implementations, each of the plurality of resources may include subchannels. In such cases, the second resource may be adjacent the first resource in a frequency domain.

In some implementations, in identifying the first resource of the plurality of resources, processor 412 may perform certain operations. For instance, processor 412 may exclude, from the plurality of resources, a first subset of one or more resources and a second subset of one or more resources to result in a remaining subset of resources of the plurality of resources, with the first subset of one or more resources not having been monitored and with each resource of the second subset of one or more resources being reserved or having a respective measured PSSCH or PSCCH reference signal received power (RSRP) higher than a power threshold. In an event that the remaining subset of resources comprise less than a predetermined percentage (e.g., 20% or 25%) of the plurality of resources, processor 412 may increase the power threshold by a predefined amount to exclude the second subset of one or more resources from the plurality of resources. Additionally, processor 412 may report the remaining subset of resources, which includes the first resource, to a higher layer with each resource of the remaining subset of resources associated a respective weighting value.

In some implementations, in selecting the second resource of the plurality of resources, processor 412 may perform certain operations. For instance, processor 412 may select the second resource from one or more resources of the remaining subset of resources each of which being associated with a non-zero weighting value. Alternatively, processor 412 may select the second resource based on the respective weighting value of each resource of the remaining subset of resources.

In some implementations, in identifying the first resource of the plurality of resources, processor 412 may perform additional operations. For instance, processor 412 may set the power threshold based on a configuration received from a network, based on preconfigured information, or based on a transmission power of first UE 110. Moreover, processor 412 may initialize the respective weighting values of each resource of the remaining subset of resources to an initial value.

In some implementations, in selecting the second resource of the plurality of resources, processor 412 may increase the weighting values of adjacent resources on two opposite sides in a frequency domain of each resource having the respective measured PSSCH or PSCCH RSRP higher than the power threshold.

In some implementations, in increasing the weighting values of the adjacent resources, processor 412 may increase the respective weighting value of each of two adjacent resources on the two opposite sides by a predefined amount. Alternatively, in increasing the weighting values of the adjacent resources, processor 412 may increase weighting values of one or more resources on each of the two opposite sides such that, on each of the two sides, the respective weighting value of an adjacent resource is increased by a first amount and a next adjacent resource is increased by a second amount smaller than the first amount.

In some implementations, in selecting the second resource of the plurality of resources, processor 412 may perform additional operations. For instance, processor 412 may calculate a respective combined weighting value of each resource of the remaining subset of resources. Furthermore, processor 412 may select the second resource based on the combined weighing values of the remaining subset of resources.

In some implementations, in calculating the respective combined weighting value of each resource of the remaining subset of resources, processor 412 may calculate the respective combined weighting value of each resource of the remaining subset of resources using a maximum function or linear combination. In such cases, in selecting the second resource based on the combined weighing values of the remaining subset of resources, processor 412 may take one of multiple approaches.

Under a first approach, processor 412 may perform a first selection procedure. For instance, processor 412 may identify one or more resources from the remaining subset of resources with each having the respective combined weighting value greater than 0. Additionally, processor 412 may select the second resource from the one or more resources.

Under a second approach, processor 412 may perform a second selection procedure. For instance, processor 412 may sort the remaining subset of resources in a descending order by the combined weighting values. Moreover, processor 412 may select the second resource from the remaining subset of resources by performing one of: (a) selecting the second resource from a top predetermined percentile of resources of the sorted one or more resources; (b) selecting the second resource responsive to the second resource having the largest respective combined weighting value than that of other resources of the remaining subset of resources; and (c) selecting the second resource from one or more resources having the respective combined weighting values larger than that of other resources of the remaining subset of resources.

Under a third approach, processor 412 may perform a third selection procedure. For instance, processor 412 may select the second resource based on the respective combined weighting value of each resource of the remaining subset of resources. For instance, each respective combined weighting value may be representative of a probability and, accordingly, the higher the combined weighting value the higher the probability it is for selection for transmission.

Illustrative Processes

Figure 5:
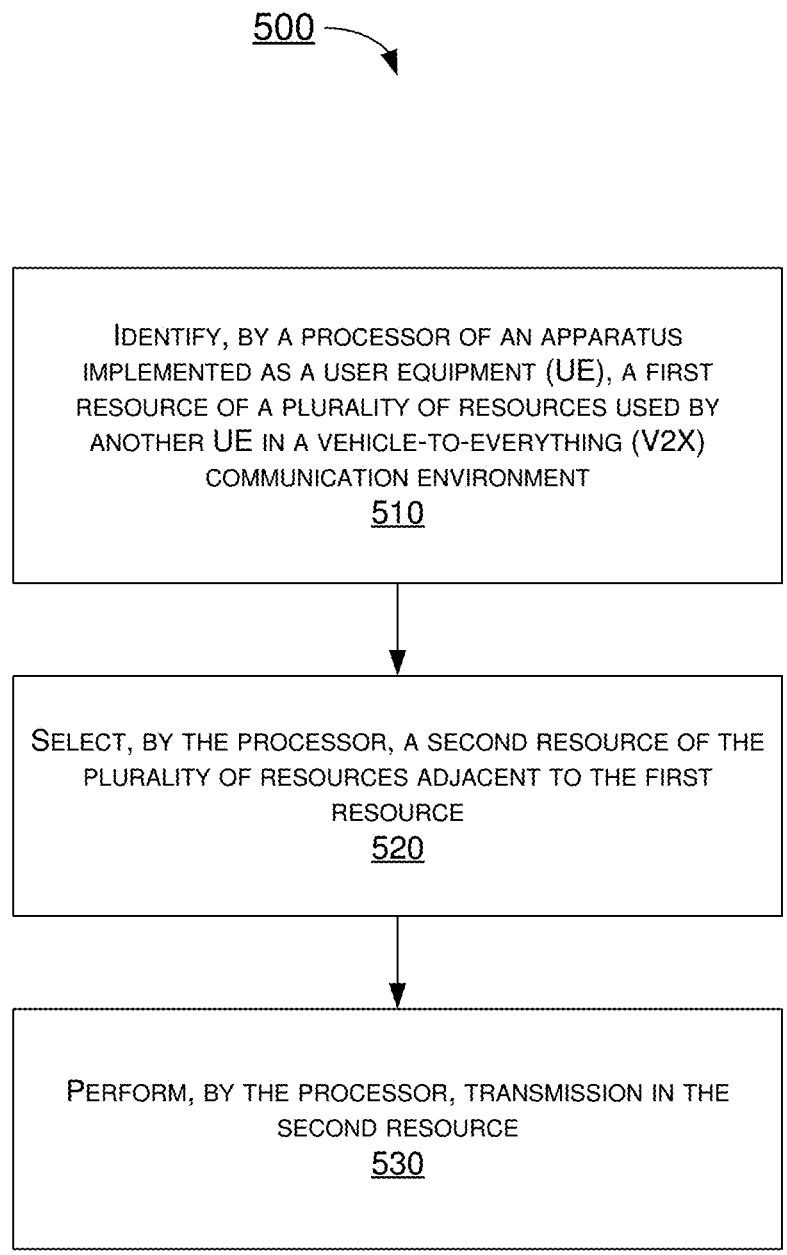
FIG. 5 is a flowchart of an example process in accordance with an implementation of the present disclosure.

FIG. 5 illustrates an example process 500 in accordance with an implementation of the present disclosure. Process 500 may be an example implementation of the proposed schemes described above with respect to resource allocation in presence of IBE for NR V2X mobile communications in accordance with the present disclosure. Process 500 may represent an aspect of implementation of features of apparatus 410 and apparatus 420. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 410, apparatus 420 and/or any suitable wireless communication device, UE, RSU, base station or machine type devices. Solely for illustrative purposes and without limitation, process 500 is described below in the context of apparatus 410 as a UE (e.g., first UE 110) and apparatus 420 as another UE (e.g., second UE 120 or third UE 125) in an NR V2X mobile communication environment (e.g., network environment 100). Process 500 may begin at block 510.

At 510, process 500 may involve processor 412 of apparatus 410 (e.g., implemented in first UE 110) identifying, via transceiver 416, a first resource of a plurality of resources used by another UE in a V2X communication environment. Process 500 may proceed from 510 to 520.

At 520, process 500 may involve processor 412 selecting a second resource of the plurality of resources adjacent to the first resource. Process 500 may proceed from 520 to 530.

At 530, process 500 may involve processor 412 performing, via transceiver 416, transmission in the second resource.

In some implementations, each of the plurality of resources may include subchannels. In such cases, the second resource may be adjacent the first resource in a frequency domain.

In some implementations, in identifying the first resource of the plurality of resources, process 500 may involve processor 412 performing certain operations. For instance, process 500 may involve processor 412 excluding, from the plurality of resources, a first subset of one or more resources and a second subset of one or more resources to result in a remaining subset of resources of the plurality of resources, with the first subset of one or more resources not having been monitored and with each resource of the second subset of one or more resources being reserved or having a respective measured PSSCH or PSCCH reference signal received power (RSRP) higher than a power threshold. In an event that the remaining subset of resources comprise less than a predetermined percentage (e.g., 20% or 25%) of the plurality of resources, process 500 may involve processor 412 increasing the power threshold by a predefined amount to exclude the second subset of one or more resources from the plurality of resources. Additionally, process 500 may involve processor 412 reporting the remaining subset of resources, which includes the first resource, to a higher layer with each resource of the remaining subset of resources associated a respective weighting value.

In some implementations, in selecting the second resource of the plurality of resources, process 500 may involve processor 412 performing certain operations. For instance, process 500 may involve processor 412 selecting the second resource from one or more resources of the remaining subset of resources each of which being associated with a non-zero weighting value. Alternatively, process 500 may involve processor 412 selecting the second resource based on the respective weighting value of each resource of the remaining subset of resources.

In some implementations, in identifying the first resource of the plurality of resources, process 500 may involve processor 412 performing additional operations. For instance, process 500 may involve processor 412 setting the power threshold based on a configuration received from a network, based on preconfigured information, or based on a transmission power of first UE 110. Moreover, process 500 may involve processor 412 initializing the respective weighting values of each resource of the remaining subset of resources to an initial value.

In some implementations, in selecting the second resource of the plurality of resources, process 500 may also involve processor 412 increasing the weighting values of adjacent resources on two opposite sides in a frequency domain of each resource having the respective measured PSSCH or PSCCH RSRP higher than the power threshold.

In some implementations, in increasing the weighting values of the adjacent resources, process 500 may involve processor 412 increasing the respective weighting value of each of two adjacent resources on the two opposite sides by a predefined amount. Alternatively, in increasing the weighting values of the adjacent resources, process 500 may involve processor 412 increasing weighting values of one or more resources on each of the two opposite sides such that, on each of the two sides, the respective weighting value of an adjacent resource is increased by a first amount and a next adjacent resource is increased by a second amount smaller than the first amount.

In some implementations, in selecting the second resource of the plurality of resources, process 500 may involve processor 412 performing additional operations. For instance, process 500 may involve processor 412 calculating a respective combined weighting value of each resource of the remaining subset of resources. Furthermore, process 500 may involve processor 412 selecting the second resource based on the combined weighing values of the remaining subset of resources.

In some implementations, in calculating the respective combined weighting value of each resource of the remaining subset of resources, process 500 may involve processor 412 calculating the respective combined weighting value of each resource of the remaining subset of resources using a maximum function or linear combination. In such cases, in selecting the second resource based on the combined weighing values of the remaining subset of resources, process 500 may involve processor 412 taking one of multiple approaches.

Under a first approach, process 500 may involve processor 412 performing a first selection procedure. For instance, process 500 may involve processor 412 identifying one or more resources from the remaining subset of resources with each having the respective combined weighting value greater than 0. Additionally, process 500 may involve processor 412 selecting the second resource from the one or more resources.

Under a second approach, process 500 may involve processor 412 performing a second selection procedure. For instance, process 500 may involve processor 412 sorting the remaining subset of resources in a descending order by the combined weighting values. Moreover, process 500 may involve processor 412 selecting the second resource from the remaining subset of resources by performing one of: (a) selecting the second resource from a top predetermined percentile of resources of the sorted one or more resources; (b) selecting the second resource responsive to the second resource having the largest respective combined weighting value than that of other resources of the remaining subset of resources; and (c) selecting the second resource from one or more resources having the respective combined weighting values larger than that of other resources of the remaining subset of resources.

Under a third approach, process 500 may involve processor 412 performing a third selection procedure. For instance, process 500 may involve processor 412 selecting the second resource based on the respective combined weighting value of each resource of the remaining subset of resources. For instance, each respective combined weighting value may be representative of a probability and, accordingly, the higher the combined weighting value the higher the probability it is for selection for transmission.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    identifying, by a processor of an apparatus implemented as a user equipment (UE), a first resource of a plurality of resources used by another UE in a vehicle-to-everything (V2X) communication environment;

selecting, by the processor, a second resource of the plurality of resources adjacent to the first resource; and performing, by the processor, transmission in the second resource, wherein the identifying of the first resource of the plurality of resources comprises:

excluding, from the plurality of resources, a first subset of one or more resources and a second subset of one or more resources to result in a remaining subset of resources of the plurality of resources;

in an event that the remaining subset of resources comprise less than a predetermined percentage of the plurality of resources, excluding the second subset of one or more resources from the plurality of resources; and reporting the remaining subset of resources to a higher layer with each resource of the remaining subset of resources.

2. The method of claim 1, wherein each of the plurality of resources comprise subchannels, and wherein the second resource is adjacent the first resource in a frequency domain.

3. The method of claim 1, wherein the first subset of one or more resources has not been monitored and each resource of the second subset of one or more resources either is reserved or has a respective measured Physical Sidelink Shared Channel (PSSCH) or Physical Sidelink Control Channel (PSCCH) reference signal received power (RSRP) higher than a power threshold.

4. The method of claim 3, wherein the selecting of the second resource of the plurality of resources comprises:

selecting the second resource from one or more resources of the remaining subset of resources each of which being associated with a non-zero weighting value; or selecting the second resource based on the respective weighting value of each resource of the remaining subset of resources.

5. The method of claim 3, wherein the identifying of the first resource of the plurality of resources further comprises:

setting the power threshold based on a configuration received from a network, based on preconfigured information, or based on a transmission power of the UE; and initializing the respective weighting values of each resource of the remaining subset of resources to an initial value.

6. The method of claim 5, wherein the selecting of the second resource of the plurality of resources comprises increasing the weighting values of adjacent resources on two opposite sides in a frequency domain of each resource having the respective measured PSSCH or PSCCH RSRP higher than the power threshold.

7. The method of claim 6, wherein the increasing of the weighting values of the adjacent resources comprises increasing the respective weighting value of each of two adjacent resources on the two opposite sides by a predefined amount.

8. The method of claim 6, wherein the increasing of the weighting values of the adjacent resources comprises increasing weighting values of one or more resources on each of the two opposite sides such that, on each of the two sides, the respective weighting value of an adjacent resource is increased by a first amount and a next adjacent resource is increased by a second amount smaller than the first amount.

9. The method of claim 6, wherein the selecting of the second resource of the plurality of resources further comprises:

calculating a respective combined weighting value of each resource of the remaining subset of resources; and selecting the second resource based on the combined weighing values of the remaining subset of resources.

10. The method of claim 9, wherein the calculating of the respective combined weighting value of each resource of the remaining subset of resources comprises calculating the respective combined weighting value of each resource of the remaining subset of resources using a maximum function or linear combination.

11. The method of claim 9, wherein the selecting of the second resource based on the combined weighing values of the remaining subset of resources comprises:

identifying one or more resources from the remaining subset of resources with each having the respective combined weighting value greater than 0; and selecting the second resource from the one or more resources.

12. The method of claim 9, wherein the selecting of the second resource based on the combined weighing values of the remaining subset of resources comprises:

sorting the remaining subset of resources in a descending order by the combined weighting values; and selecting the second resource from the remaining subset of resources by performing one of:

selecting the second resource from a top predetermined percentile of resources of the sorted one or more resources;

selecting the second resource responsive to the second resource having the largest respective combined weighting value than that of other resources of the remaining subset of resources; and selecting the second resource from one or more resources having the respective combined weighting values larger than that of other resources of the remaining subset of resources.

13. The method of claim 9, wherein the selecting of the second resource based on the combined weighing values of the remaining subset of resources comprises selecting the second resource based on the respective combined weighting value of each resource of the remaining subset of resources.

14. An apparatus implemented as a user equipment (UE), comprising:

a communication device configured to communicate wirelessly in a vehicle-to-everything (V2X) communication environment; and a processor coupled to the communication device such that the processor performs operations comprising:

identifying a first resource of a plurality of resources used by another UE;

selecting a second resource of the plurality of resources adjacent to the first resource; and performing, via the communication device, transmission in the second resource, wherein, in identifying the first resource of the plurality of resources, the processor performs operations comprising:

excluding, from the plurality of resources, a first subset of one or more resources and a second subset of one or more resources to result in a remaining subset of resources of the plurality of resources;

in an event that the remaining subset of resources comprise less than a predetermined percentage of the plurality of resources, excluding the second subset of one or more resources from the plurality of resources; and reporting the remaining subset of resources to a higher layer with each resource of the remaining subset of resources.

15. The apparatus of claim 14, wherein the first subset of one or more resources has not been monitored and each resource of the second subset of one or more resources either is reserved or has a respective measured Physical Sidelink Shared Channel (PSSCH) or Physical Sidelink Control Channel (PSCCH) reference signal received power (RSRP) higher than a power threshold.

16. The apparatus of claim 15, wherein, in identifying the first resource of the plurality of resources, the processor further performs operations comprising:

setting the power threshold based on a configuration received from a network, based on preconfigured information, or based on a transmission power of the UE; and initializing the respective weighting values of each resource of the remaining subset of resources to an initial value.

17. The apparatus of claim 16, wherein, in selecting the second resource of the plurality of resources, the processor increases the weighting values of adjacent resources on two opposite sides in a frequency domain of each resource having the respective measured PSSCH or PSCCH RSRP higher than the power threshold.

18. The apparatus of claim 17, wherein, in increasing the weighting values of the adjacent resources, the processor performs either of:

increasing the respective weighting value of each of two adjacent resources on the two opposite sides by a predefined amount; and increasing weighting values of one or more resources on each of the two opposite sides such that, on each of the two sides, the respective weighting value of an adjacent resource is increased by a first amount and a next adjacent resource is increased by a second amount smaller than the first amount.

19. The apparatus of claim 17, wherein, in selecting the second resource of the plurality of resources, the processor further performs operations comprising:

calculating a respective combined weighting value of each resource of the remaining subset of resources; and selecting the second resource based on the combined weighing values of the remaining subset of resources by performing a first selection procedure, a second selection procedure, or a third selection procedure, wherein the first selection procedure comprises:

identifying one or more resources from the remaining subset of resources with each having the respective combined weighting value greater than 0; and selecting the second resource from the one or more resources, wherein the second selection procedure comprises:

sorting the remaining subset of resources in a descending order by the combined weighting values; and selecting the second resource from the remaining subset of resources by performing one of:

selecting the second resource from a top predetermined percentile of resources of the sorted one or more resources;

selecting the second resource responsive to the second resource having the largest respective combined weighting value than that of other resources of the remaining subset of resources; and selecting the second resource from one or more resources having the respective combined weighting values larger than that of other resources of the remaining subset of resources, and wherein the third selection procedure comprises selecting the second resource based on the respective combined weighting value of each resource of the remaining subset of resources being proportional to a probability for transmission.

20. The apparatus of claim 19, wherein, in calculating the respective combined weighting value of each resource of the remaining subset of resources, the processor calculates the respective combined weighting value of each resource of the remaining subset of resources using a maximum function or linear combination.

* * * * *